(12) United States Patent
Chandarana (10) Patent No.: US 11,812,262 B2
(45) Date of Patent: Nov. 7, 2023

(54) DEVICE AUTHENTICATION

(71) Applicant: BRITISH TELECOMMUNICATIONS PUBLIC LIMITED COMPANY, London (GB)

(72) Inventor: Amar Chandarana, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 134 days.

(21) Appl. No.: 16/956,077

(22) PCT Filed: Dec. 6, 2018

(86) PCT No.: PCT/EP2018/083838
§ 371 (c)(1),
(2) Date: Jun. 19, 2020

(87) PCT Pub. No.: WO2019/121043
PCT Pub. Date: Jun. 27, 2019

(65) Prior Publication Data
US 2020/0322799 A1    Oct. 8, 2020

(30) Foreign Application Priority Data

Dec. 22, 2017  (EP) ..................................... 17210433

(51) Int. Cl.
*H04W 4/00* (2018.01)
*H04W 12/06* (2021.01)
(Continued)

(52) U.S. Cl.
CPC .......... *H04W 12/068* (2021.01); *H04W 4/80* (2018.02); *H04W 12/03* (2021.01);
(Continued)

(58) Field of Classification Search
CPC ............. H04W 12/0608; H04W 60/00; H04W 12/001; H04W 12/04071; H04W 4/80; H04W 12/00; H04W 12/04
(Continued)

(56) References Cited

U.S. PATENT DOCUMENTS 8,392,712 B1* 3/2013 Wilson .................... H04L 63/08
713/175
8,717,931 B2* 5/2014 Taniuchi ................. H04L 41/12
370/254

(Continued)

FOREIGN PATENT DOCUMENTS

CN        102571766 A    7/2012

OTHER PUBLICATIONS

International Search Report and Written Opinion of the ISA for PCT/EP2018/083838 dated Feb. 18, 2019, 9 pages.
(Continued)

*Primary Examiner* — Marceau Milord
(74) *Attorney, Agent, or Firm* — Nixon & Vanderhye P.C.

(57) ABSTRACT

A method of registering a device with an authentication service; in which the method comprises the device; establishing a secure connection between the device and a second device: in which the second device is registered with the authentication service; in which the second device is allocated to the user, in which the secure connection comprises one of: a wireless data connection; and a wired data connection over a LAN; in which the method further comprises tire device: obtaining over tire secure connection from the registered device, an identifier uniquely associated with the registered device; providing to tire authentication service a first credential known to the user; and a second credential derived front tire identifier, and requesting registration on tire basis of tire first and second credentials.

27 Claims, 6 Drawing Sheets

(51) Int. Cl.
  *H04W 4/80* (2018.01)
  *H04W 60/00* (2009.01)
  *H04W 12/03* (2021.01)
  *H04W 12/0471* (2021.01)
  *H04W 84/12* (2009.01)

(52) U.S. Cl.
  CPC ....... *H04W 12/0471* (2021.01); *H04W 60/00* (2013.01); *H04W 84/12* (2013.01)

(58) Field of Classification Search
  USPC ....................................................... 370/329
  See application file for complete search history.

(56) References Cited

U.S. PATENT DOCUMENTS

| | | | | |
|---|---|---|---|---|
| 8,769,304 | B2* | 7/2014 | Kirsch | G06Q 20/0855 713/189 |
| 8,775,647 | B2* | 7/2014 | Collart | G06F 16/4393 709/229 |
| 9,544,714 | B2* | 1/2017 | Krochmal | H04W 4/80 |
| 10,055,567 | B2* | 8/2018 | Ulrich | G06F 21/35 |
| 10,251,063 | B2* | 4/2019 | Myers | G06F 3/0484 |
| 10,270,748 | B2* | 4/2019 | Briceno | H04L 63/205 |
| 10,306,705 | B2* | 5/2019 | Shanmugam | H04W 84/12 |
| 10,419,907 | B2* | 9/2019 | Redding | H04M 3/42178 |
| 10,769,635 | B2* | 9/2020 | Lindemann | G06K 9/00604 |
| 2011/0195665 | A1* | 8/2011 | Friedlaender | H04W 12/50 455/41.2 |
| 2012/0054841 | A1* | 3/2012 | Schultz | G06F 21/51 726/22 |
| 2012/0167185 | A1* | 6/2012 | Menezes | H04L 67/563 726/5 |
| 2013/0217332 | A1* | 8/2013 | Altman | H04W 4/025 455/41.2 |
| 2013/0269011 | A1* | 10/2013 | Wilson | H04L 63/08 726/6 |
| 2014/0256251 | A1* | 9/2014 | Caceres | H04W 12/084 455/41.1 |
| 2014/0258113 | A1* | 9/2014 | Gauthier | G06Q 20/204 705/41 |
| 2014/0274150 | A1* | 9/2014 | Marti | H04W 8/18 455/456.3 |
| 2014/0289833 | A1* | 9/2014 | Briceno | H04W 12/06 726/7 |
| 2014/0291395 | A1* | 10/2014 | Wankmueller | G07F 7/1008 235/381 |
| 2014/0341132 | A1* | 11/2014 | Kim | H04W 48/16 370/329 |
| 2014/0370879 | A1* | 12/2014 | Redding | H04M 3/42178 455/419 |
| 2015/0098469 | A1* | 4/2015 | Chudgar | H04L 45/74 370/392 |
| 2015/0127938 | A1* | 5/2015 | Chastain | G06F 21/77 713/168 |
| 2015/0254662 | A1* | 9/2015 | Radu | G06Q 20/202 705/21 |
| 2015/0332258 | A1* | 11/2015 | Kurabi | G06Q 20/3278 705/71 |
| 2015/0347738 | A1* | 12/2015 | Ulrich | G06F 21/35 726/17 |
| 2015/0350865 | A1* | 12/2015 | Conn | H04W 76/14 455/41.2 |
| 2015/0351004 | A1* | 12/2015 | Ko | H04W 4/80 455/434 |
| 2015/0356289 | A1* | 12/2015 | Brown | H04L 63/0884 726/7 |
| 2016/0073440 | A1* | 3/2016 | Pallen | H04W 76/15 370/329 |
| 2016/0080510 | A1* | 3/2016 | Dawoud Shenouda Dawoud | H04N 21/4223 709/225 |
| 2016/0134488 | A1 | 5/2016 | Straub et al. | |
| 2016/0164855 | A1 | 6/2016 | Johansson et al. | |
| 2016/0294822 | A1 | 10/2016 | George | |
| 2016/0337346 | A1* | 11/2016 | Momchilov | G06F 21/41 |
| 2017/0155684 | A1 | 6/2017 | Pelkey | |
| 2017/0370879 | A1 | 12/2017 | Aetukuri et al. | |
| 2018/0041503 | A1* | 2/2018 | Lindemann | H04L 63/0442 |
| 2018/0109419 | A1* | 4/2018 | Schallich | H04L 41/24 |
| 2018/0182666 | A1* | 6/2018 | Uzoh | H01L 21/32135 |
| 2018/0191501 | A1* | 7/2018 | Lindemann | G06F 3/0647 |
| 2018/0375724 | A1* | 12/2018 | Schallich | H04L 41/0806 |
| 2019/0123904 | A1* | 4/2019 | Ackerman | G06F 21/57 |
| 2019/0213318 | A1* | 7/2019 | Gnanasekaran | H04W 12/06 |
| 2021/0006461 | A1* | 1/2021 | Schallich | H04L 41/08 |

OTHER PUBLICATIONS

Search Report for EP17210433.3 dated Jun. 26, 2018, 8 pages.
Huseynov et al., "WIFIOTP: Pervasive Two-Factor Authentication Using Wi-Fi SSID Broadcasts", University of Geneva—2015 ITU Kaleidoscope Academic Conference, 2015, 8 pages.
First Notification of Office Action dated Dec. 21, 2022 issued for Chinese Application No. 201880081743.2 (7 pages).

* cited by examiner

DEVICE AUTHENTICATION

This application is the U.S. national phase of International Application No. PCT/EP2018/083838 filed Dec. 6, 2018 which designated the U.S. and claims priority to EP Patent Application No. 17210433.3 filed Dec. 22, 2017, the entire contents of each of which are hereby incorporated by reference.

The invention relates to authentication services and to registration of a device with an authentication service.

BACKGROUND AND SUMMARY

Network access points for computer networks such as wired or wireless access points provide access to a network such as a local area network, a wide area network or a combination of both for computing devices. Such devices can include mobile devices such as mobile computers, cellular telephones, pervasive devices, wearable devices and the like, internet of things (IoT) devices including sensors, appliances, detectors, switches, transmitters, receivers and the like, and other mobile devices as will be apparent to those familiar with the field of computer networks. Security is often provided by an authentication service enforcing two-factor authentication. In order to use two-factor authentication to prove their identity, a user needs something they know (e.g. a password also known to the authentication service) and something they have.

Current technology is able to crack a large number of commonly-used passwords. A hacker only needs access to a user's username (often this is the user's email address) and password in order to access and even control a user's registered devices. Customers tend to re-use their passwords across multiple third-party services, thus making vulnerable other services accessed by the user.

Authentication of a user's device (e.g. a mobile phone) may be achieved by registering the mobile phone with an authentication service, as follows. The authentication service will typically send an SMS message containing a PIN code to the phone number of the mobile phone. The user then operates their mobile phone to send the PIN back to the authentication service by a different link, normally via an app or a web browser loaded on the mobile phone. Successfully returning the PIN validates that the user has access to the mobile phone (something you have). However, the dependence on SMS introduces weaknesses into the authentication scheme as SMS messages are not encrypted and can be unreliable, for example, due to transmission delays.

The present invention accordingly provides, in a first aspect, a method of registering a device with an authentication service; in which the method comprises the device: establishing a secure connection between the device and a second device; in which the second device is registered with the authentication service; in which the second device is allocated to the user; in which the secure connection comprises one of: a wireless data connection over a local area network; and a wired data connection over a local area network; in which the method further comprises the device: obtaining over the secure connection from the registered device, an identifier uniquely associated with the registered device; providing to the authentication service a first credential known to the user; and a second credential derived from the identifier; and requesting registration on the basis of the first and second credentials.

Once the device has been successfully registered, this provides a source of enhanced security in the form of "something you have". Advantageously, the solution offers an improved customer experience as it can be implemented automatically, once the unregistered mobile phone is within range of the local area network, and does not involve one time tokens, PIN numbers exchanged via SMS, etc.

The present invention accordingly provides, in a second aspect, the device: establishing secure connections between the device and a plurality of second devices, in which each of the plurality of second devices is (already) registered with the authentication service; in which each of the plurality of second devices is allocated to the user; in which each of the secure connections comprises one of: a wireless data connection over a local area network; and a wired data connection over a local area network; obtaining from each of the plurality of registered devices, an identifier uniquely associated with the registered device; providing to the authentication service a plurality of second credentials derived from the identifiers obtained from each of the plurality of registered devices; and requesting registration on the basis of the first and the plurality of second credentials.

According to an embodiment, the second credential may be derived from the identifier by virtue of, for example, comprising a hash of the identifier, comprising an encrypted form of the identifier or simply comprising the identifier.

Preferably, the/each identifier, the first credential and/or the/each second credential is/are directly obtained and/or provided over (and preferably only over) the/each secure connection.

Preferably, the/each identifier, the first credential and/or the/each second credential is directly obtained and/or provided via a secure application programming interface.

Preferably, the secure application programming interface is provided (or hosted) by the first device.

Preferably, the/each identifier, the first credential and/or the/each second credential is obtained and/or provided only when the first and second network device are connected to the same local area network.

Preferably, registration of the first device is performed regardless of its location (having provided to the authentication service the first and second credentials). Location may be: absolute; relative to the second device; and/or relative to the local area network.

Preferably, the/each identifier, the first credential and/or the/each second credential is obtained and/or provided by unicasting or multicasting. Preferably, the/each identifier, the first credential and/or the/each second credential is obtained and/or provided without broadcasting.

Preferably, registration of the first device with the authentication service is permanent. Preferably, registration is not time-limited/temporary. Preferably, the first device is available to be registered with the authentication service without the secure connection, the first device having obtained the/each identifier.

Preferably, the identifier is static (i.e. it remains unchanged with each iteration of the aforementioned method) or dynamic (i.e. it changes between iterations of the aforementioned method).

According to an embodiment, the wireless data connection may be a Wi-Fi™ connection as specified in IEEE 802.11.

According to an embodiment, the wireless data connection may be a Bluetooth™ connection as specified by the Bluetooth™ Special Interest Group.

According to an embodiment, the method may comprise the device establishing that the device and the second device are connected via a local area network by means of checking that the IP address of the device is within the same address domain as the IP address of the second device.

According to an embodiment, the method may comprise the device establishing that the device and the second device are connected via a local area network by means of checking that the SSID of the wireless network that the device is connected to is the same as the SSID of the wireless network that the second device is connected to.

According to an embodiment, the device and the, or each second device may share a key.

According to an embodiment, the, or each secure connection is established over at least one of Wi-Fi™, Bluetooth™, Zwave™, ZigBee™, Ethernet and USB™.

According to an embodiment, the, or each secure connection may be established over a peer-to-peer link.

According to an embodiment, the device may be one of: a mobile phone, a tablet device and a mobile computing device, each with communications capability.

According to an embodiment, the device and the, or each second device are co-located.

Preferably, the/each identifier, the first credential and/or the/each second credential is encrypted.

Preferably, wherein the first device is suitable to be the second device in a further iteration of the aforementioned method, once the first device has been registered with the authentication service.

According to an embodiment, the, or each secure connection may extend over premises occupied by the user.

According to an embodiment, the, or each secure connection may be constrained to premises occupied by the device and by the second device.

The present invention accordingly provides, in a third aspect, a computer program element comprising computer program code to, when loaded into a computer system and executed thereon, cause the computer to perform the steps of a method as set out, above.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

BRIEF DESCRIPTION OF THE DRAWINGS

The invention extends to a method of registering a device as described herein and/or substantially as illustrated with reference to the accompanying drawings.

In order that the present invention may be better understood, embodiments thereof will now be described, by way of example only, with reference to the accompanying drawings in which.

DETAILED DESCRIPTION OF EMBODIMENTS

We now describe exemplary embodiments that address the situation where a user wants to authenticate an unregistered device (e.g. mobile phone or desktop computer) for accessing a secure resource such as an online account. According to exemplary embodiments, authentication of the unregistered device is based on an additional factor added to the conventional single-factor authentication, while avoiding reliance on SMS. According to an embodiment, the additional factor exploits communication over a user's local area network between a user's unregistered device and a second device registered with an authentication service. Devices are said to be connected to or to belong to the same local area network when their network addresses belong to the same subnet and/or when both have the same broadcast address. A local area network may typically be based on a Wi-Fi™/Ethernet router such as the BT Home Hub™ from British Telecommunications plc™. An example of a second device that may be connected to a user's local area network and registered with an authentication service is an Internet of things (IoT) device. IoT devices include thermostats, smart speakers, smart power outlets, networked cameras and other devices providing a wide range of different functions. IoT devices in a user's home are often connected to a user's local area network, such as a Wi-Fi™ or Ethernet network to provide for communication with other local devices and, via a broadband modem, with remote servers over the internet. Access over the user's local area network to the second device over a wired connection is secure by virtue of being restricted to devices with direct access to the physical wiring of the local area network, which will normally imply access inside the user's premises or other restricted area. Access to the second device over a wireless connection will be restricted to devices within the physical range of the local wireless network that could extend into the street and to neighbouring properties. Access over a wireless connection can be secure by virtue of being further restricted to devices that are securely logged into a wireless hub or router facilitating communication in the local area network.

Figure 1:
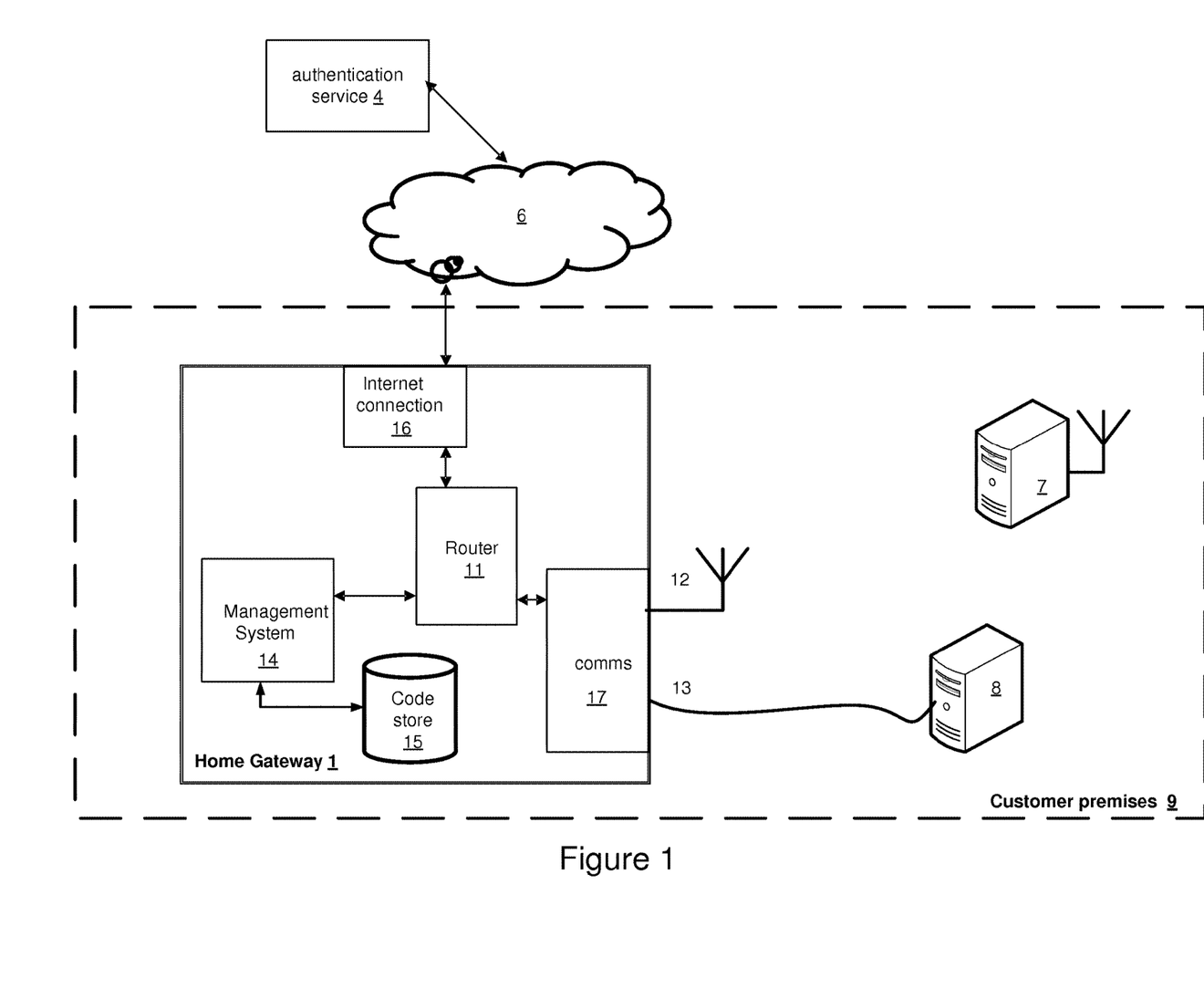
FIG. 1 shows schematically an exemplary local area network.

FIG. 1 shows an exemplary local area network with a base station (broadband home gateway 1) supporting the local area network over wireless and wired connections. The local area network will typically be installed at a customer's premises 9, and connected over a data communications system such as the Internet 6 to one or more remote servers including authentication service 4. The home gateway 1 has a communications interface hardware 17 supporting communications under control of a processor over wireless interface 12 for wireless (e.g. Wi-Fi™) communication with one or more wireless devices 7 and a wired interface 13 for (e.g. Ethernet) communication over a cable connection with one or more wired devices 8. The home gateway 1 also includes a router 11 for switching communications traffic between the local area network interfaces 12, 13 and an external connection hardware 16, thereby providing connectivity between devices 7, 8 connected to the home gateway 1 and an external communications network such as the "internet" 6. The home gateway 1 is controlled by management system 14, comprising the processor (not shown) for executing management software code held in code store 15 to control operation of the home gateway, including operation of router 11, external connection hardware 16 and communications interface hardware 17. As used herein, the term processor broadly refers to a computing device such as a microcontroller, microprocessor, a microcomputer, a programmable logic controller, an application specific integrated circuit, and any other programmable circuit with the capacity to execute a stored program.

Figure 2:
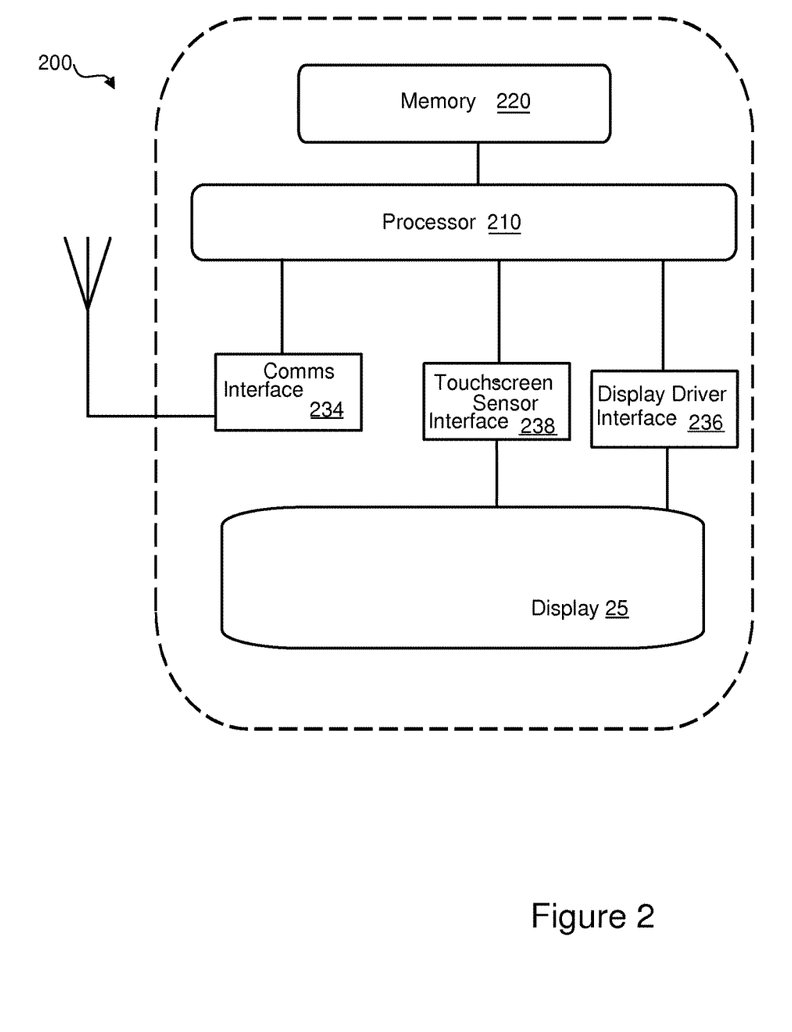
FIG. 2 shows schematically an exemplary mobile phone.

FIG. 2 shows an exemplary mobile phone 200 in more detail. The main functional elements of the mobile phone 200 are a processor 210 operationally coupled to a memory 220. Memory 220 has stored therein computer software code that provides instructions for controlling various aspects of the operation of mobile phone 200, such as wireless communication and the display of messages and web pages. Communications interface hardware 234 is provided for transmitting and receiving communications traffic under control of processor 210. The communications interface may be a wireless transceiver connected to an antenna for wireless communications. Display driver interface hardware 236 is connected to the touch screen display 25 for provision on the display of graphical elements under control of processor 210. Touch screen sensor interface hardware 238 is connected to touch screen display 25 for processing touch signals under control of processor 210.

Figure 3:
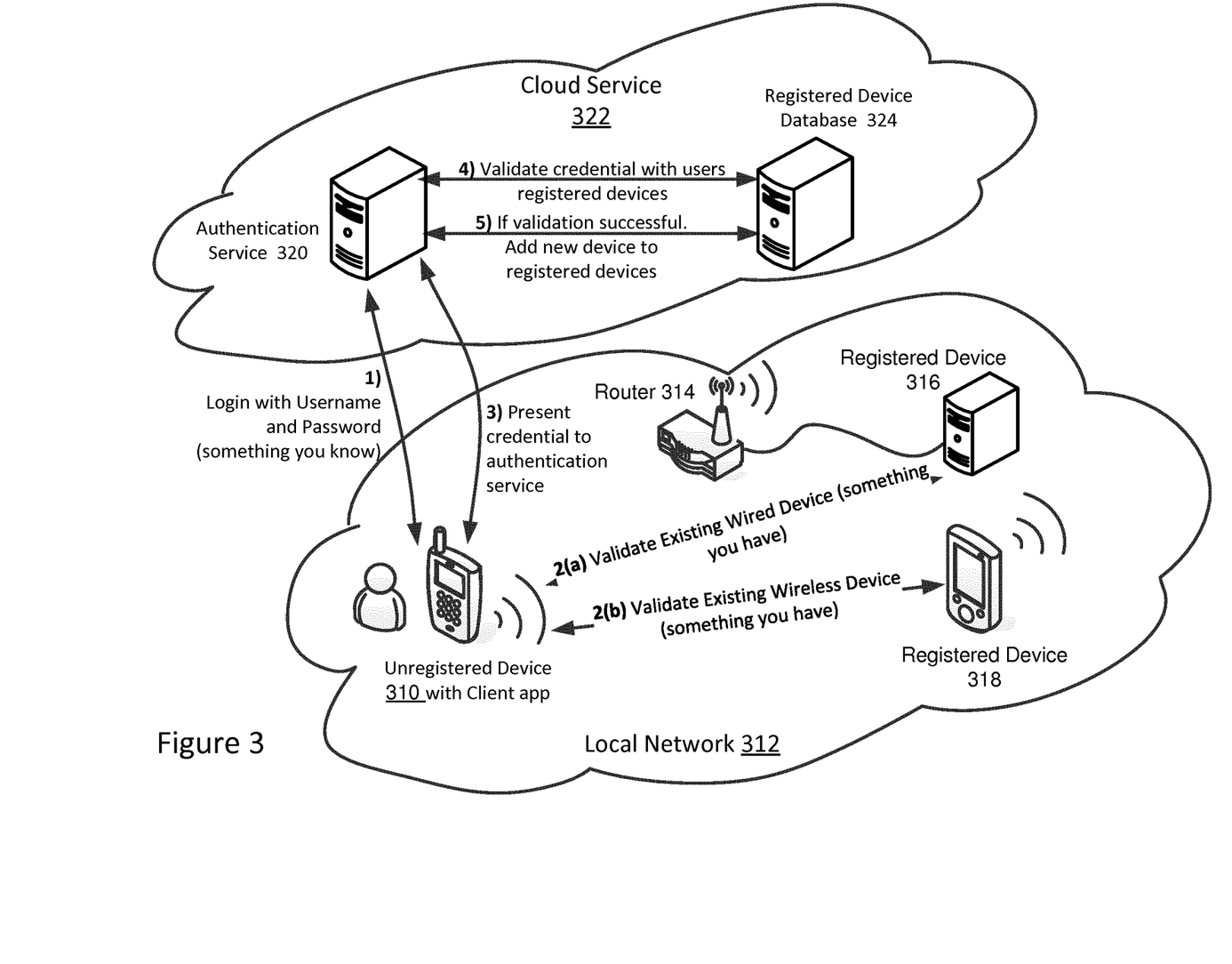
FIGS. 3 and 4 show schematically systems for registering a device with an authentication service according to embodiments.

FIG. 3 shows, by way of exemplary embodiment, a system for registering a device with an authentication service. An unregistered device 310 is connected in a local area network 312 via local area network router 314. Other devices, such as personal computer 316 and IoT device 318 are also connected in a local area network 312 via local area network router 314. According to an embodiment, one or more pairs of devices may be mutually connected in a peer-to-peer relationship (although such connections are not shown for reasons of clarity). Local area network 312 is connected via local area network router 314 over the Internet to a remote authentication server 320 located in cloud service 322. Authentication service 320, for example a server running authentication software code, has access to a database 324 holding records of devices that are registered with the authentication service 320.

Figure 4:
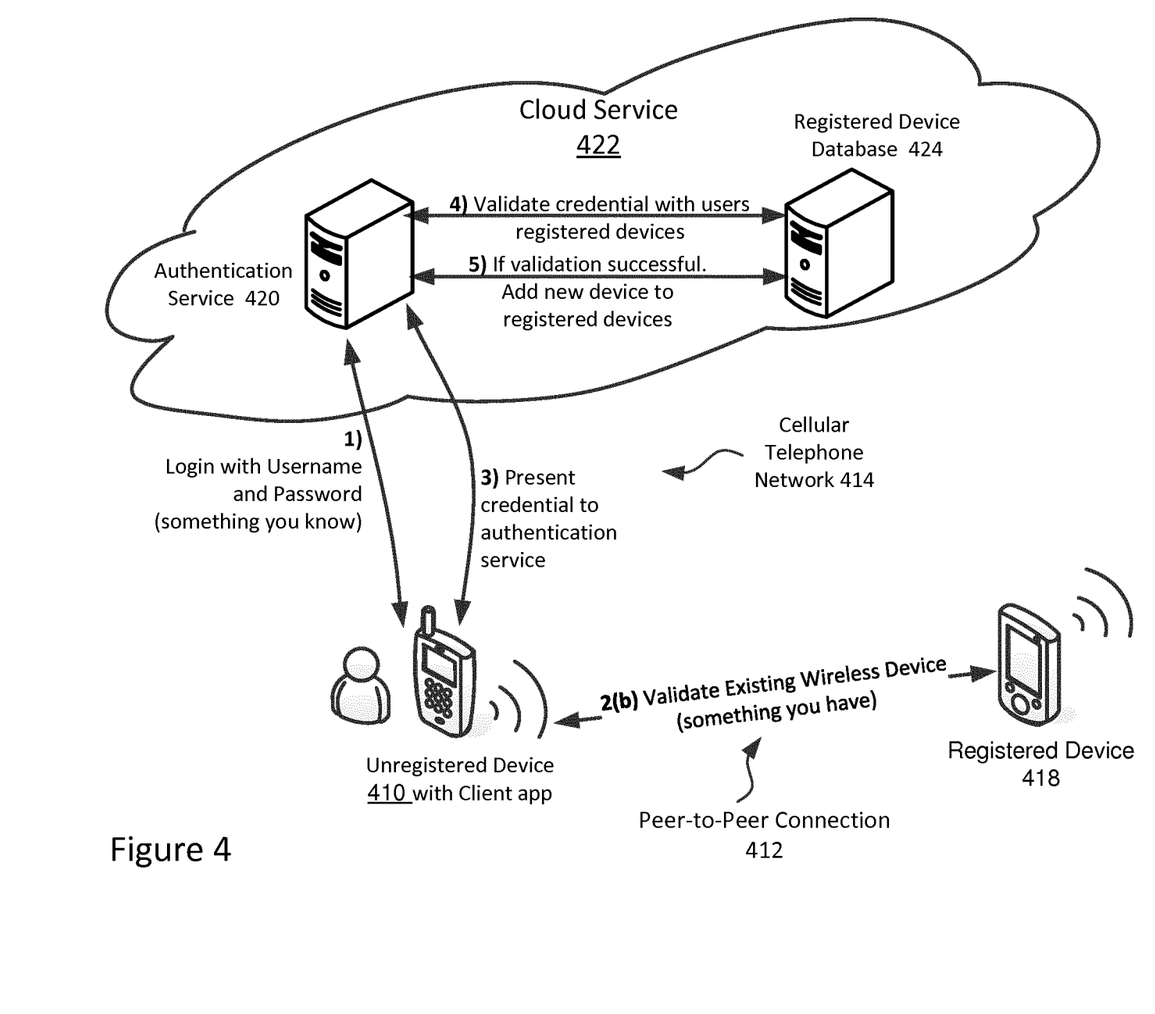

FIG. 4 shows, by way of a further exemplary embodiment, a further system for registering a device with an authentication service. An unregistered device 410 and a registered device 418 (e.g. an IoT device) are mutually connected over an exclusive peer-to-peer connection 412. Unregistered device 410 is also connected via cellular telephone network 414 and over the Internet to a remote authentication server 420 located in cloud service 422. Authentication service 420, for example a server running authentication software code, has access to a database 424 holding records of devices that are registered with the authentication service 420.

Figure 5:
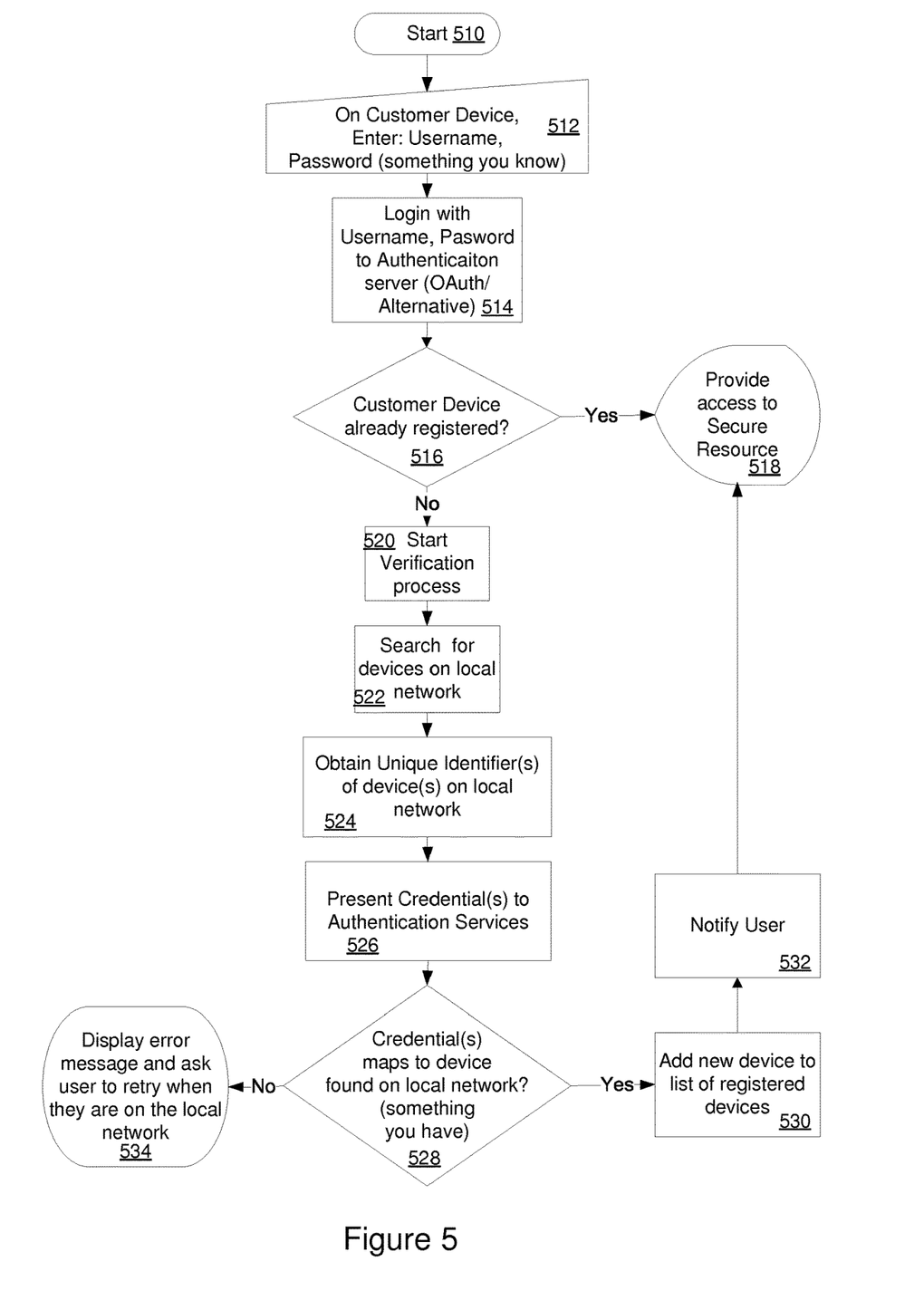
FIGS. 5 and 6 indicate operations of embodiments.

We now discuss by way of exemplary embodiment, with reference to FIG. 5, an application of the invention to registering with an authentication service, a user's mobile phone when connected in a local area network. It will be appreciated that the present 3c) invention is not specific to mobile phones and that the present invention covers other embodiments directed to the authentication of other types of user device, such as desktop computers running Windows' software, tablet computers running Android™ software, IoT devices and wearable tech. When the user is at home, the user's mobile phone may be connected over WiFi™ to the home local area network. An alternative embodiment applies to a user's desktop computers running Windows™ software connected over an Ethernet cable to the home local area network. Mobile phone apps (such as those offered by Nest® and Belkin™) are available for monitoring and controlling IoT devices over, for example, Wi-Fi™. We now describe registering the unregistered mobile phone with the authentication service based, in part, on an exchange between the mobile phone and a second device (e.g. an IoT device) that is connected to the user's local area network and is already registered with the authentication service.

According to the proposed solution, the unregistered mobile phone runs a client app that implements a security process on the mobile phone to validate that the user is who they say they are. Returning to FIG. 5, at 512, the user enters credentials (something you know) e.g. the user's Username and Password. The client app is programmed to communicate with the authentication service and, at 514, provides the entered credentials to the authentication service, for example, via OAuth or using an alternative API based login. The client app also provides to the authentication service a unique identifier for the user's device. For a mobile phone the unique identifier could be a UUID (RFC 4122). For other forms of user device, other forms of unique identifier may be preferred, for example, for a desktop computer, a unique identifier may be derived from a user agent header (RFC 1945). At 516 the authentication service checks whether a record of the unique device identifier (e.g. UUID, or another unique ID) exists in the registered device database 324 to indicate that the user's mobile phone is already registered. Where the user's mobile phone is recorded as being already registered, at 518, the authentication service provides the user with access to the secure resource. Where the user's mobile phone is not recorded as being already registered, at 520 the authentication service notifies the client app to initiate a secondary security validation process based on "something you have".

Where notified by the authentication service, the client app checks for devices connected to the local area network that the mobile phone is currently connected to. Upon starting the verification process, at 522 the client app searches for other devices on the same, local area network as the user's mobile phone that are allocated to the user. The client app communicates with other devices on the local area network to obtain one or more unique identifier allocated to the device, (e.g. UUID, or another unique ID). In order to do this securely, according to one embodiment the client app authenticates with the second device via a proprietary API (application programming interface) running on the registered device. Where the client app finds one or more other devices on the same, local area network 312, at 524 the client app obtains one or more identifier unique to the, or each, other device on the same, local area network. Once one or more identifier is successfully obtained from at least one other device on the local area network, the client app running on the unregistered mobile phone communicates with the authentication service and presents the one or more identifier to the authentication service as one or more credential. Having obtained at least one identifier unique to another device on the same local area network, at 526 the client app presents one or more further credential to the authentication service 320, where the or each credential is derived from one or more device-unique identifier obtained from another device on the same local area network.

At 528, the authentication service 320 checks whether a record exists in the registered device database 324 that maps, to a registered device allocated to the user, the one or more credential received from the unregistered device. A device can be allocated to a user at the time of set-up, i.e. when the user first configures the device, such as an IoT device, to connect to their local area network. In other embodiments a device, e.g. a set top box, can be allocated to a user at the point of despatch. A list of devices allocated to each user is then made available to the authentication server, e.g. "set top box with serial number XYX12345 has been sent to jo.vloggs@bt.com".

Where a match is successfully found in the record of unique Identifiers, this indicates to the authentication service that the unregistered mobile phone has access to a device allocated to that user and that is registered with the authentication service, i.e. "something you have." Where a suitable record or records are found, at 530, the authentication service adds the unique identifier of user's previously unregistered device to a list of registered devices allocated to the user and, at 532, notifies the user accordingly. According to an embodiment, at 518, the authentication service may provide the user with access to the secure resource. The user is now able to log into the authentication service with two-part authentication by using the mobile phone (i.e. presenting the unique identifier of the mobile phone) as an additional credential, independent of any connection to the local area network. In the alternative case, where no suitable record or records are found in the registered device database, the authentication service prompts the user's mobile phone at 534 to display a suitable error or help message, e.g. prompting the user to retry when they are on the local area network.

Figure 6:
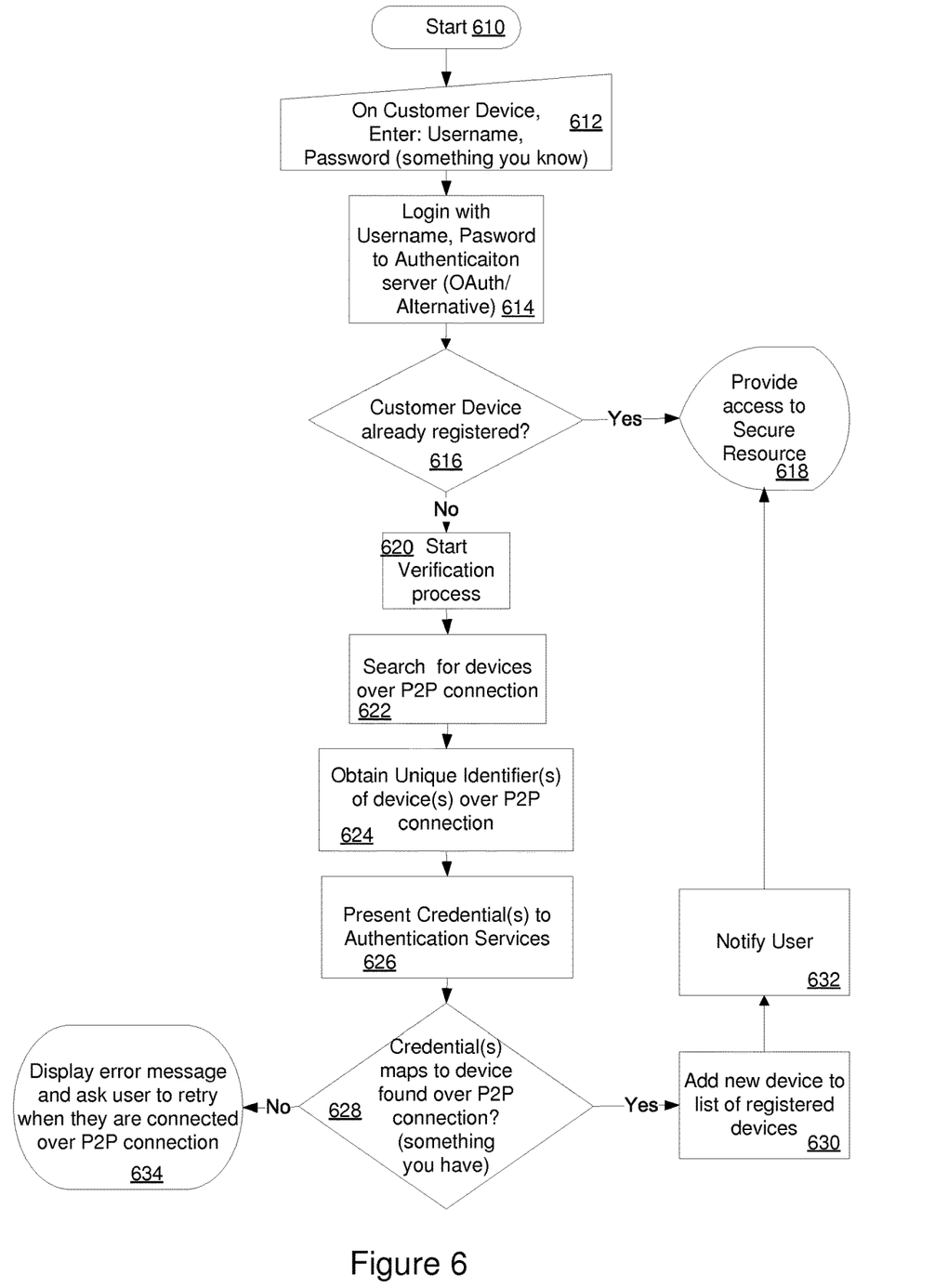

We now discuss by way of exemplary embodiment, with reference to FIG. 6, a further application of the invention to registering a user's mobile phone when connected in a P2P connection with an authentication service, i.e. were the local area network equates to a link between two devices. A common P2P technology is Bluetooth™ and we now describe, by way of exemplary embodiment, registering an unregistered mobile phone with the authentication service based, in part, on an exchange between the mobile phone and a second device (e.g. an IoT device) that communicates over Bluetooth™ and is already registered with the authentication service. Bluetooth™ communication is a standard feature on modern mobile phones. When a user mobile phone is within range of an active Bluetooth™ device, i.e. a device such as an IoT device which is actively transmitting a Bluetooth™ signal, the user's mobile phone may connect over Bluetooth™ to the Bluetooth™ device.

According to the proposed solution, the unregistered mobile phone runs a client app that implements a security process on the mobile phone to validate that the user is who they say they are. Returning to FIG. 6, at 612, the user enters credentials (something you know) e.g. the user's Username and Password. At 614, the credentials entered are presented to the authentication service using OAuth or an alternative. The unique device ID of the mobile device is also presented to the authentication service. At 616 the authentication service checks whether the unique device ID record exists in the registered device database 324 to indicate that the user's mobile phone is already registered. Where the user's mobile phone is recorded as being already registered, at 618, the authentication service provides the user with access to the secure resource. Where the user's mobile phone is not recorded as being already registered, at 620 the authentication service notifies the client app to start a verification process. Upon starting the verification process, at 622 the client app searches for other Bluetooth™-capable devices within range of the user's mobile phone that are allocated to the user. Where the client app finds a Bluetooth™ device within range, at 624 the client app establishes a Bluetooth™ connection with the Bluetooth™ device and obtains one or more identifier unique to the Bluetooth™ device. Having obtained, over the Bluetooth™ connection, at least one identifier unique to another device, at 626 the client app presents, via cellular telephone network 414 and over the Internet, one or more further credential to the authentication service 320, where the or each credential is derived from the one or more identifier unique to another device. At 628, the authentication service 320 checks whether a record exists in the registered device database 324 that maps the credential to a registered device allocated to the user. Where a suitable record or records are found, at 630, the authentication service adds the user's previously unregistered device to a list of registered devices allocated to the user and, at 632, notifies the user accordingly. At 618, the authentication service provides the user with access to the secure resource. In the alternative case, where no suitable record or records are found in the registered device database, the authentication service prompts the user's mobile phone at 634 to display a suitable error or help message, e.g. prompting the user to retry when they are next in range of an active Bluetooth™ device.

The client app could establish a local area network connection via a router or by a direct, peer-to-peer (P2P) local area network connection between the mobile phone and the registered device. There are several ways the interaction between the unregistered mobile phone and the registered device can be implemented. According to an embodiment, an interaction carried out via a router may comprise either (1) or (2), below, or a combination of (1) and (2):

1) Based on the IP address allocated to the mobile phone, the client app checks that the IP address of the unregistered mobile phone is within the address domain of the local area network i.e. within the same address domain as the mobile phone (for example, where the address domain of the local area network is 192.168.x.x and the IP address of the registered IoT device is also comprised in the address range 192.168.x.x). Other address ranges will be available for use by enterprise 1.0 networks that have no direct connection to other enterprise networks or to the Internet.
2) The client app can check that the SSID of the wireless network that the unregistered mobile phone is connected to is the same as the SSID of the wireless network that the registered device is connected. For example, the client app talks to the registered device via a secure API and ask the registered device to confirm the SSID of the wireless network it is connected to.

The unregistered device talks to the registered device in via the router, gets the unique ID from the registered device and presents it to the authentication service which indicates whether the unique ID corresponds to a registered device that is allocated to the user.

According to an embodiment, an interaction carried out via P2P may comprise (3), below.

3) The client app establishes a direct P2P connection between the mobile phone and the second device (e.g. via Wi-Fi™ or Bluetooth™). In the case of Bluetooth™' the client app obtains a unique ID from the second device on an encrypted Bluetooth™ link with a shared common "link key" which is used to exchange encrypted data securely. In the case of P2P WiFi™ this interaction on the local area network would be similar to a standard Wi-Fi™ network with a router. The local area network is validated based on i) the IP address being within the address domain and also ii) validating that the SSID the client device is connected to is the same SSID the gateway device is broadcasting. The unregistered device talks to the registered device in P2P mode, gets the unique ID from the registered device and presents it to the authentication service which indicates whether the unique ID corresponds to a registered device that is allocated to the user.

The local area network may comprise, DECT or lower power wireless technologies such as ZWave™, Zigbee™ and Bluetooth™. These technologies typically use a gateway which is either connected to, or included in a router. The gateway acts as an intermediary for all communication over the low specific wireless frequency range. According to an embodiment, an interaction carried out via DECT or low power wireless technologies may comprise the unregistered mobile device sends to the router a request for a search for registered devices. The router forwards the request to the gateway that then interrogates the lower power wireless technology devices for their unique ID. The unique IDs are passed back to the router that then makes the unique IDs available to the client app. The client app then proceeds to request registration as described in the above cases. As above, communication with the router may be wired or wireless.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention. The invention is not limited to use of a mobile phone and may be implemented using an alternative device, such as a tablet or computer, which is able to communicate over a local wireless communications network as well over a telephone network.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of registering a device with an authentication service, the method, being performed by a first device, comprises the steps of:
    establishing a secure connection between the first device and a second device, in which the second device is registered with the authentication service and is allocated to a user, and in which the secure connection comprises one of:
    a wireless data connection over a local area network; and
    a wired data connection over a local area network;
    obtaining over the secure connection from the second device, an identifier uniquely associated with the second device;
    providing to the authentication service a first credential known to the user; and a second credential derived from the identifier; and
    requesting registration of the first device with the authentication service on the basis of the first and second credentials.

2. A method according to claim 1, further comprising the steps of:
    establishing secure connections between the first device and a plurality of second devices, in which each of the plurality of second devices is registered with the authentication service and is allocated to the user, and in which each of the secure connections comprises one of:
    a wireless data connection over a local area network; and
    a wired data connection over a local area network;
    obtaining from each of the plurality of second devices, an identifier uniquely associated with at least one of the plurality of second devices;
    providing to the authentication service a plurality of second credentials derived from the identifiers obtained from each of the plurality of second devices; and
    requesting registration on the basis of the first and the plurality of second credentials.

3. A method according to claim 1, wherein the/each identifier, the first credential and/or the/each second credential is directly obtained and/or provided over the/each secure connection.

4. A method according to claim 1, wherein the/each identifier, the first credential and/or the/each second credential is directly obtained and/or provided via a secure application programming interface.

5. A method according to claim 4, wherein the secure application programming interface is provided by the first device.

6. A method according to claim 1, wherein the/each identifier, the first credential and/or the/each second credential is obtained and/or provided only when the first and second devices are connected to the same local area network.

7. A method according to claim 1, wherein registration of the first device is performed regardless of its location.

8. A method according to claim 1, wherein the/each identifier, the first credential and/or the/each second credential is obtained and/or provided by unicasting or multicasting.

9. A method according to claim 1, wherein registration of the first device with the authentication service is permanent.

10. A method according to claim 1, wherein the wireless data connection is a Wi-Fi™ connection as specified in IEEE 802.11.

11. A method according to claim 1, wherein the wireless data connection is a Bluetooth™ connection as specified by the Bluetooth™ Special Interest Group.

12. A method according to claim 1, wherein the first device and the, or each, second device share a key.

13. A method according to claim 1, further comprising the step of the first device establishing that the first device and the, or each, second device are connected via a local area network by means of checking that the IP address of the first device is within the same address domain as the IP address of the second device.

14. A method according to claim 1, further comprising the step of the first device establishing that the first device and the, or each, second device are connected via a local area network by means of checking that the SSID of the wireless network that the first device is connected is the same as the SSID of the wireless network that the, or each, second device is connected.

15. A method according to claim 1, wherein the, or each, secure connection is established over at least one of Wi-Fi™, Bluetooth™, Zwave™, ZigBee™ Ethernet and USB™.

16. A method according to claim 1, wherein the, or each, secure connection is established over a peer-to-peer link.

17. A method according to claim 1, wherein the first device is one of: a mobile phone, a tablet, and a mobile computing device, each with communications capability.

18. A method according to claim 1, wherein the first device and the, or each, second device are co-located.

19. A method according to claim 1, wherein the, or each, secure connection extends over premises occupied by the user.

20. A method according to claim 1, wherein the, or each, secure connection is constrained to premises occupied by the first device and by the second device.

21. A method according to claim 1, wherein the/each identifier, the first credential and/or the/each second credential is encrypted.

22. A method according to claim 1, wherein the first device is suitable to be the second device in a further iteration of the method, once the first device has been registered with the authentication service.

23. A non-transitory computer-readable storage medium storing computer program code to, when loaded into a computer system and executed thereon, cause the computer to perform the steps of a method according to claim 1.

24. A device configured to be registered with an authentication service, the device comprising:
 a memory storing computer code; and
 a processor, operationally coupled to the memory, for executing the computer code such that the device is at least configured to:
 establish a secure connection between the device and a second device, in which the second device is registered with the authentication service and is allocated to a user, and in which the secure connection comprises one of:
  a wireless data connection over a local area network; and
  a wired data connection over a local area network;
 obtain over the secure connection from the second device, an identifier uniquely associated with the second device;
 provide to the authentication service a first credential known to the user; and a second credential derived from the identifier; and
 request registration of the device with the authentication service on the basis of the first and second credentials.

25. The device according to claim 24, wherein the device is further configured to:
 establish secure connections between the device and a plurality of second devices, in which each of the plurality of second devices is registered with the authentication service and is allocated to the user, and in which each of the secure connections comprises one of:
  a wireless data connection over a local area network; and
  a wired data connection over a local area network;
 obtain from each of the plurality of second devices, an identifier uniquely associated with at least one of the plurality of second devices;
 provide to the authentication service a plurality of second credentials derived from the identifiers obtained from each of the plurality of second devices; and
 request registration on the basis of the first and the plurality of second credentials.

26. The device according to claim 24, wherein to establish that the device and the, or each, second device are connected via the local area network, the device is further configured to check that the IP address of the device is within the same address domain as the IP address of the second device.

27. The device according to claim 24, wherein to establish that the device and the, or each, second device are connected via the local area network, the device is further configured to check that an SSID of the wireless network that the device is connected is the same as an SSID of the wireless network that the, or each, second device is connected.

* * * * *